(12) United States Patent
Swapnesh et al.

(10) Patent No.: US 8,929,236 B2
(45) Date of Patent: Jan. 6, 2015

(54) NETWORK FLOW ANALYSIS

(75) Inventors: Banerjee Swapnesh, Bangalore Karnataka (IN); Bhattacharya Samik, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 281 days.

(21) Appl. No.: 13/561,451

(22) Filed: Jul. 30, 2012

(65) Prior Publication Data

US 2014/0029452 A1    Jan. 30, 2014

(51) Int. Cl.
*H04L 1/00* (2006.01)
(52) U.S. Cl.
USPC .......................................... 370/252
(58) Field of Classification Search
USPC ................................. 370/252–254
See application file for complete search history.

(56) References Cited

U.S. PATENT DOCUMENTS

| | | | |
|---|---|---|---|
| 6,556,957 B1 * | 4/2003 | Daumer ........................ | 702/193 |
| 7,193,968 B1 | 3/2007 | Kapoor et al. | |
| 7,768,919 B1 * | 8/2010 | Conway ........................ | 370/232 |
| 2009/0303879 A1 * | 12/2009 | Duffield et al. ............... | 370/235 |
| 2010/0157840 A1 * | 6/2010 | Sen et al. ...................... | 370/253 |
| 2010/0284283 A1 | 11/2010 | Golic et al. | |
| 2011/0022354 A1 | 1/2011 | Kumar | |
| 2011/0173015 A1 | 7/2011 | Chapman et al. | |

FOREIGN PATENT DOCUMENTS

WO    2012000540 A1    1/2012

OTHER PUBLICATIONS

"Introductory Statistics", Neil Weiss, 2008, pp. 140-144.*
Lakhina, A. et al. "Structural Analysis of Network Traffic Flows" < http://www.cc.gatech.edu/classes/AY2007/cs7260_spring/papers/odflows-sigm04.pdf > pp. 61-72; vol. 32; Issue: 1. Jun. 2004.

* cited by examiner

*Primary Examiner* — Peter Cheng
(74) *Attorney, Agent, or Firm* — Brooks, Cameron & Huebsch, PLLC; Jason P. Lorfing

(57) ABSTRACT

In an example network flow analysis, sample packets can be received from a stream of packets over a time interval from a network element. The sample packets can be aggregated into a subclass of packets. A sample pool size of the stream of packets in the time interval, a number of sample packets received over the time interval, and a number of sample packets aggregated into the subclass of packets can be determined. An effective sampling ratio (ESR) from the sample pool size of the stream of packets in the time interval and the number of sample packets received over the time interval can be calculated. An extrapolated flow for the subclass of sample packets can be calculated by multiplying the ESR by the number of sample packets aggregated into the subclass of packets.

15 Claims, 3 Drawing Sheets

NETWORK FLOW ANALYSIS

BACKGROUND

Modern networks can include network elements through which information travels. For example, information, which can be of different formats and can originate and/or terminate in different locations, can flow through switches and/or routers in a network. The information flowing through the switches and/or routers in the network can be monitored to determine a flow and/or other details associated with the information flowing through the switches.

DETAILED DESCRIPTION

Figure 1:
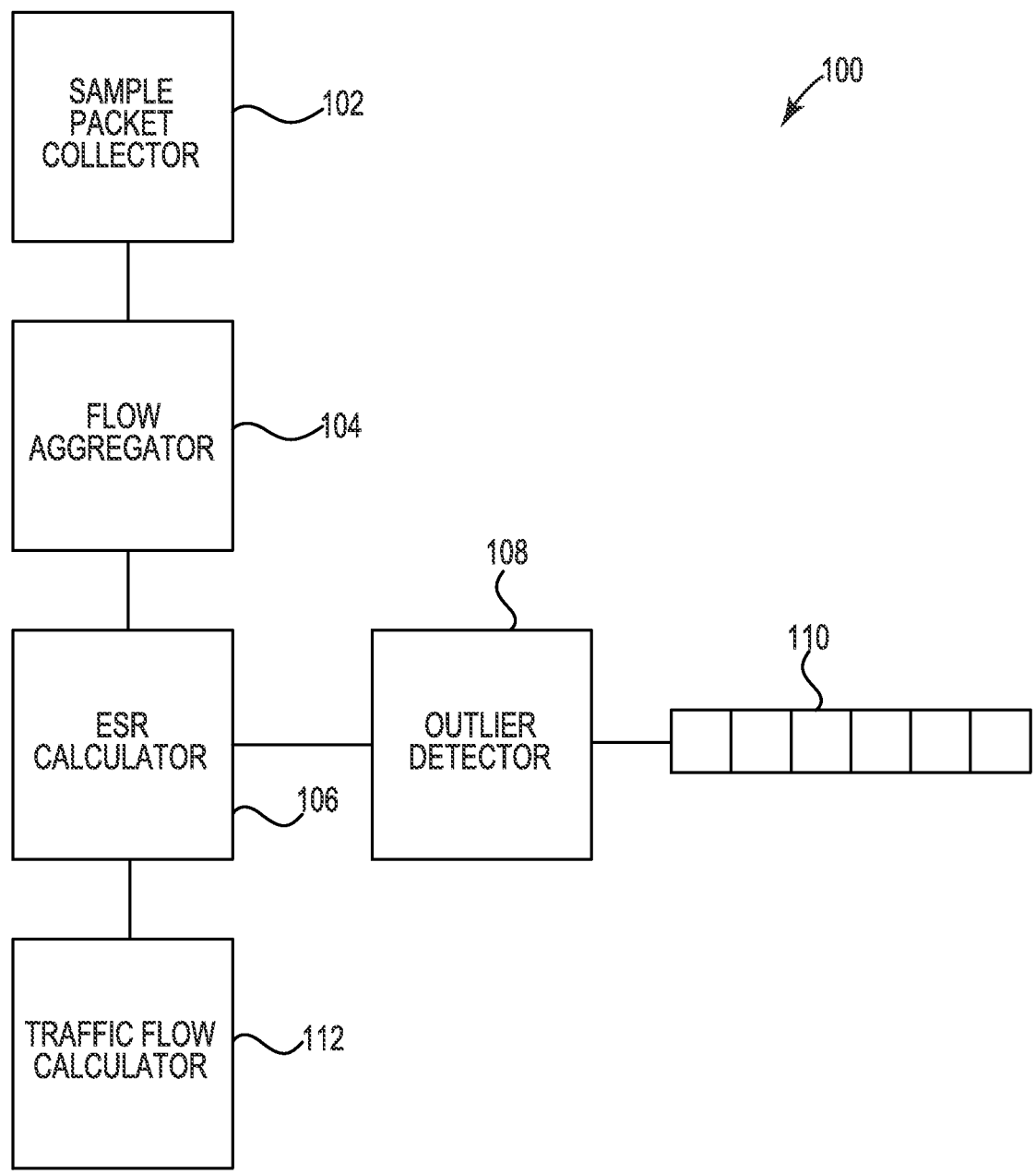
FIG. 1 illustrates an example of a system for network flow analysis according to the present disclosure.

The present disclosure provides methods, computer-readable media, and systems for network flow analysis. Sample packets can be received from a stream of packets over a time interval from a network element. The sample packets can be aggregated into a subclass of packets. A sample pool size of the stream of packets in the time interval, a number of sample packets received over the time interval, and a number of sample packets aggregated into the subclass of packets can be determined. An effective sampling ratio (ESR) from the sample pool size of the stream of packets in the time interval and the number of sample packets received over the time interval can be calculated. An extrapolated flow for the subclass of sample packets can be calculated by multiplying the ESR by the number of sample packets aggregated into the subclass of packets.

Network flow analysis can be used in network management systems. The network management systems can monitor flow in various areas of a network. Flow can be defined as a movement of information. For example, the volume of information and type of information flowing through switches and/or routers can be monitored. Monitoring the flow of information can be accomplished through use of a sampled flow (Sflow) protocol. An Sflow protocol can send a sampled set of packets from a stream of packets to a collector along with sampling parameters (e.g., type of data, number of packets, time over which the sample set of packets is collected, etc.) associated with the sampled set of packets. Based on the sampling parameters, an extrapolation can be made from the sampled set of packets to determine a flow associated with the stream of packets.

However, the extrapolation can be dependent on receiving accurate sampling parameters. For instance, an inaccurate sampling parameter can result from a packet that has been corrupted and/or has a transmission error. A packet that provides an incorrect sampling parameter can pose an issue because the incorrect parameter can be used in the extrapolation, which can cause an error in the extrapolated results.

Some examples of the present disclosure can calculate an effective sampling ratio (ESR), which can express a ratio between the sampled set of packets and the stream of packets.

In an example, the ESR can be calculated based on the sampling parameters. As such, the ESR can be used to perform the extrapolation on the sampled set of packets.

Some examples of the present disclosure can use the ESR to determine whether inaccurate sampling parameters have been received based on a determination of whether the ESR is an outlier versus a stored ESR value. When a determination is made that the ESR is an outlier, if the ESR is used to perform the extrapolation on the sampled set of packets, an error can be caused in the extrapolated results.

When the ESR is found to be an outlier, instead of discarding the sampled set of packets, collecting a new set of sampled packets, and determining a new ESR, some examples of the present disclosure can provide an ESR calculated from historical values. The ESR calculated from historical values can then be used in the extrapolation of the set of sampled packets. As such, the collection of a new set of sampled packets can be avoided, which can save computing resources. When the ESR is determined not to be an outlier, the ESR can be used in extrapolating the sampled set of packets to determine a flow associated with the stream of packets In the present disclosure, reference is made to the accompanying drawings that form a part hereof, and in which is shown by way of illustration how one or more examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates an example of a system for network flow analysis according to the present disclosure. In an example, the system 100 can include a sample packet collector 102, a flow aggregator 104, an effective sampling ratio (ESR) calculator 106, an outlier detector calculator 108, an ESR sliding window 110, and a traffic flow calculator 112. The sample packet collector 102 can receive sample packets from a stream of packets over a time interval from a network element. For example, the sample packet collector 102 can receive sample packets from a router and/or switch, for example.

As the stream of packets passes through the network element, the network element can sample a portion of the packets over the time interval. In an example, the network element can collect all of the packets over the time interval or a portion of the packets over the time interval. Upon collection of the packets, sampling parameters associated with the packet can be collected, which can include a reporting interface associated with the packet, source and destination hosts, source and destination ports, protocols, type of service, and/or volume, among others. The sampling parameters and/or the sample packets can be sent by the network element and received by the sample packet collector 102.

In an example, the flow aggregator 104 can aggregate the sample packets into a subclass of packets. For instance, the sample packets can consist of packets with different sampling parameters. Based on the different sampling parameters, the sample packets can be aggregated into one or more subclasses of packets. For instance, sample packets that have different source hosts can be aggregated into separate subclasses of packets based on the different source hosts. In an example, sample packets from a first source host can be aggregated into a first subclass and sample packets from a second source host can be aggregated into a second subclass by the flow aggregator 104. For instance, the first subclass can contain 20 packets and the second subclass can contain 80 packets.

In an example of the present disclosure, an ESR can be calculated by the ESR calculator 106 by dividing a difference between a sample pool size of the stream of packets in the time interval by a total number of sample packets received from the stream of packets. The ESR can be represented by the equation:

$$ESR=\Delta(S_p)/S_r$$

where ESR represents the effective sampling ratio, $\Delta(S_p)$ represents the sample pool size, and $S_r$ represents the total number of sample packets received in the time interval. The sample pool size can be defined as how many packets have passed through a network element over the time interval, for example.

The sample pool size can be determined by subtracting a sample pool number between two packets in the stream of packets. For example, a sample pool number of a first packet in the stream of packets in the time interval can be subtracted from a last packet in the stream of packets in the time interval. Alternatively, a sample pool number of a last packet in the stream of packets in the time interval can be subtracted from a first packet in the stream of packets in the time interval.

In an example, the sample pool number of the packets in the stream of packets can increase linearly with time. For instance, a first packet passing through the network element during the time interval can have a sample pool number of 100,000 and the last packet passing through the network element during the time interval, which happens to be a one-hundred and fifty-thousandth packet passing through the network element, can have a sample pool number of 150,000. Accordingly, the sample pool size can be calculated by taking the difference between the sample pool number of the first and last packet in the stream of packets in the time interval. For example, in the example discussed herein, the sample pool size can be 150,000–100,000, which would be 50,000.

In an example, during the time interval, 100 packets can be sampled from the stream of packets. The packets can be sampled randomly or the packets can be sampled according to a schedule (e.g., every 2 seconds). By dividing the sample pool size, 50,000, by the sample packets, 100, the ESR of the packets that have been sampled from the stream of packets can be calculated to be 500. As discussed herein, the calculated ESR can represent a ratio between the sampled set of packets and the stream of packets.

In an example where a packet in the stream of packets in the time interval has been corrupted and/or has a transmission error associated with the packet, the sample pool number of the packet can be incorrect. This can result in an incorrect ESR. For instance, where the first packet in the stream in the time interval becomes zero or the last packet in the stream becomes larger due to corruption and/or a transmission error, the ESR can become larger. As a result, this can have consequences when performing an extrapolation on the sample packets, as discussed herein.

In an example of the present disclosure, the outlier detector 108 can determine whether the calculated ESR is an outlier versus a stored array of ESR values. The stored array of ESR values can be stored in the ESR sliding window 110, which can store a number of ESR values. The calculated ESR can be determined to be an outlier if packets in the time interval from which the calculated ESR was calculated have been corrupted and/or have had a transmission error associated with the packet, resulting in a calculated ESR that is too large and/or too small, versus the ESR values in the stored array, for example. In an example, the ESR values in the array can be determined not to have been corrupted and/or determined to have no transmission errors associated with them, and can thus be considered accurate ESR values.

In an example, the determination of whether the calculated ESR is an outlier versus the stored array of ESR values can be determined through the equation:

$$Z=|\text{mean}-\text{value}|/\sigma$$

wherein Z represents an outlier value, mean represents the mean of the ESR values in the stored array and the calculated ESR, value represents the calculated ESR, and σ represents a standard deviation of the ESR values in the stored array and the calculated ESR. In an example, the outlier value can be compared to a pre-defined outlier value to determine whether the calculated ESR associated with the outlier value is an outlier.

In an example, the pre-defined outlier value can be calculated by calculating ESR values for a number of sets of sample packets. For instance, the ESR values can be calculated for each of a 100 sets of sample packets. Upon calculation of the ESR values for each of the 100 sets of sample packets, outlier values can be calculated for each of the ESR values corresponding to each of the 100 sets of sample packets. The outlier values can then be analyzed to determine a common outlier value, for example a median of the outlier values can be taken, which can be used as the pre-defined outlier value.

The pre-defined outlier value can vary according to how many sample packets are in each set of sample packets. For example, an outlier value for a calculated ESR value associated with a set of sample packets that includes 20 packets can be different for a calculated ESR value associated with a set of sample packets that includes 100 packets. As such, pre-defined outlier values can be determined for sets of sample packets that include varying numbers of packets.

In an example of the present disclosure, if the outlier value for the calculated ESR is the same as, or within a pre-determined range of the pre-defined outlier value, the calculated ESR can be determined not to be an outlier versus the stored array of ESR values. The calculated ESR can then be used by the traffic flow calculator 112 to determine an extrapolated flow for the subclass of packets by multiplying the calculated ESR by the number of sample packets aggregated into the subclass of packets. For example, the extrapolated flow for the subclass of packets can be determined through the equation:

$$T(f)=ESR*S_r(F)$$

where T(f) represents the extrapolated flow for the subclass of packets, ESR is the effective sampling ratio, and $S_r(F)$ is the number of sample packets aggregated into the subclass of packets. For example, by multiplying the number of sample packets by the ESR, the number of sample packets can be extrapolated to determine the extrapolated flow for the subclass of packets. The extrapolated flow for the subclass of packets can represent a portion of the stream of packets associated with the subclass of packets. For example, when the sample packets from the stream of packets contain a first subclass (e.g., containing 20 packets) and a second subclass (e.g., containing 80 packets), the extrapolated flow for the first subclass can be calculated by multiplying the ESR by the number of packets in the first subclass.

In an example of the present disclosure, if the calculated ESR is an outlier versus the ESR values in the stored array, the extrapolated flow for the subclass of packets can be determined by taking a mean value of the ESR values in the stored array. The mean value of the ESR values in the stored array can then be multiplied by the number of sample packets aggregated into the subclass of packets.

In an example of the present disclosure, the stored array of ESR values in the ESR sliding window 110 can be updated with the calculated ESR upon a determination that the calculated ESR is not an outlier versus the stored array of ESR values. For example, the calculated ESR can replace one of the ESR values in the array that has been in the array for the longest period of time in relation to the other ESR values in the array. As such, the ESR values in the array can be updated over time with calculated ESR values.

Figure 2:
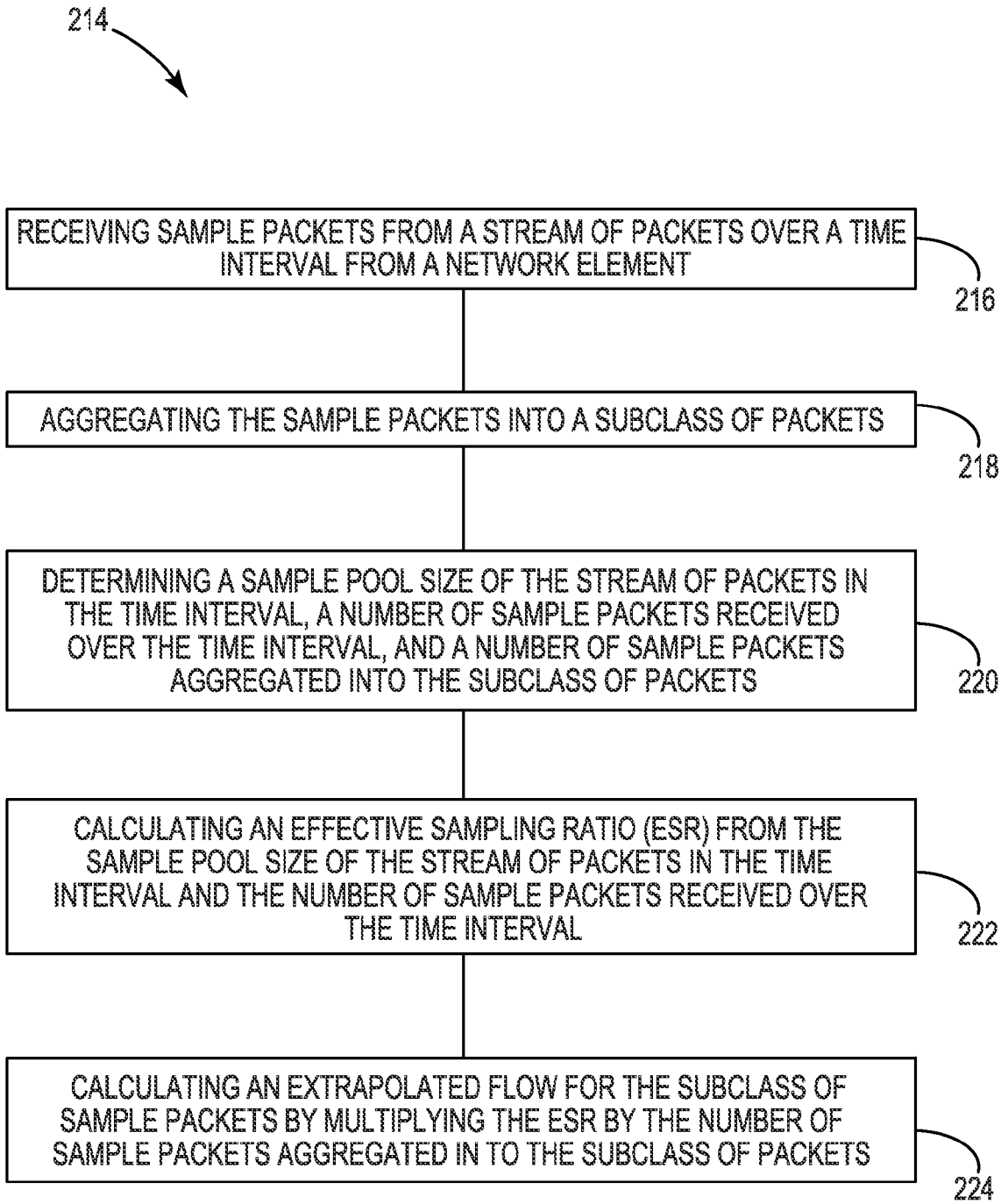
FIG. 2 is a block diagram illustrating an example of a method for network flow analysis according to the present disclosure.

FIG. 2 is a block diagram illustrating an example of a method 214 for network flow analysis according to the present disclosure. The method 214 can include receiving 216 sample packets from a stream of packets over a time interval from a network element. In an example, the sample packets can be randomly selected from the stream of packets flowing through the network element. The method can include receiving sampling parameters associated with the sample packets that include at least one of a reporting interface associated with the sample packets, source and destination hosts, source and destination ports, protocols, type of service, and volume.

The method 214 can include aggregating 218 the sample packets into a subclass of packets. For example, as discussed herein, the sample packets can have different sampling parameters, which can be used to aggregate the sample packets into different subclasses of packets.

The method 214 can include determining 220 a sample pool size of the stream of packets in the time interval, a number of sample packets received over the time interval, and a number of sample packets aggregated into the subclass of packets. In an example, the sample pool size can be calculated by subtracting a sample pool number between two packets in the stream of packets. For instance a sample pool number of a first packet in the stream of packets in the time interval can be subtracted from a last packet in the stream of packets in the time interval, as discussed herein. The number of sample packets received over the time interval can be aggregated into the subclass of packets, which can be determined, as discussed herein.

The method 214 can include calculating 222 an effective sampling ratio (ESR) from the sample pool size of the stream of packets in the time interval and the number of sample packets received over the time interval. In an example, calculating the ESR from the sample pool size of the stream of packets in the time interval and the number of sample packets received over the time interval can include dividing the difference between the sample pool number of the first packet and the last packet in the stream of packets in the time interval by the number of sample packets received over the time interval, as discussed herein.

In an example of the present disclosure, the method can include determining whether the calculated ESR is an outlier versus a stored ESR, as discussed herein. The determination of whether the calculated ESR is an outlier can be used to determine whether the calculated ESR should be used for performing an extrapolation for the subclass of sample packets. In an example, the method can include calculating a mean of the stored ESR and the calculated ESR and determining whether the calculated ESR is an outlier versus the stored ESR as a function of a difference of the mean of the stored ESR and the calculated ESR, a standard deviation of the stored ESR, and the calculated ESR. As discussed herein, the method can include calculating whether the calculated ESR is an outlier versus the stored ESR by determining a mean of the stored ESR and the calculated ESR and dividing a difference of the mean of the stored ESR and the calculated ESR by a standard deviation of the stored ESR and the calculated ESR.

The method 214 can include calculating 224 an extrapolated flow for the subclass of sample packets as a function of the calculated ESR and the number of sample packets aggregated into the subclass of packets. In an example, this can be accomplished by multiplying the calculated ESR by the number of sample packets aggregated into the subclass of packets. In an example, the extrapolated flow can include an extrapolated volume. For example, the subclass of sample packets can contain a volume of data (e.g., bytes), which can be extrapolated for the stream of packets over the time interval.

In an example, the calculated ESR can be used to determine the extrapolated flow for the subclass of sample packets when the calculated ESR is not an outlier versus the stored ESR. When the calculated ESR is not an outlier, this can be an indication that packets in the time interval from which the calculated ESR was calculated have not been corrupted and/or have not had a transmission error associated with the packets in the time interval. As such, using the ESR, which has been determined to not be an outlier, for the extrapolation of the flow of the subclass of sample packets can increase the accuracy of the extrapolation of the flow.

In an example of the present disclosure, the method can include using a value for the calculated ESR based on the stored ESR to determine the extrapolated flow for the subclass of sample packets when the calculated ESR is an outlier versus the stored ESR. The value for the calculated ESR based on the stored ESR can be determined by taking a mean value of a plurality of stored ESRs. The plurality of stored ESRs can be previously determined and found to be accurate. Taking the mean value of the plurality of stored ESRs can smooth out any discrepancies between each of the plurality of stored ESRs, which can provide a more accurate extrapolation for the flow of the subclass of sample packets.

Figure 3:
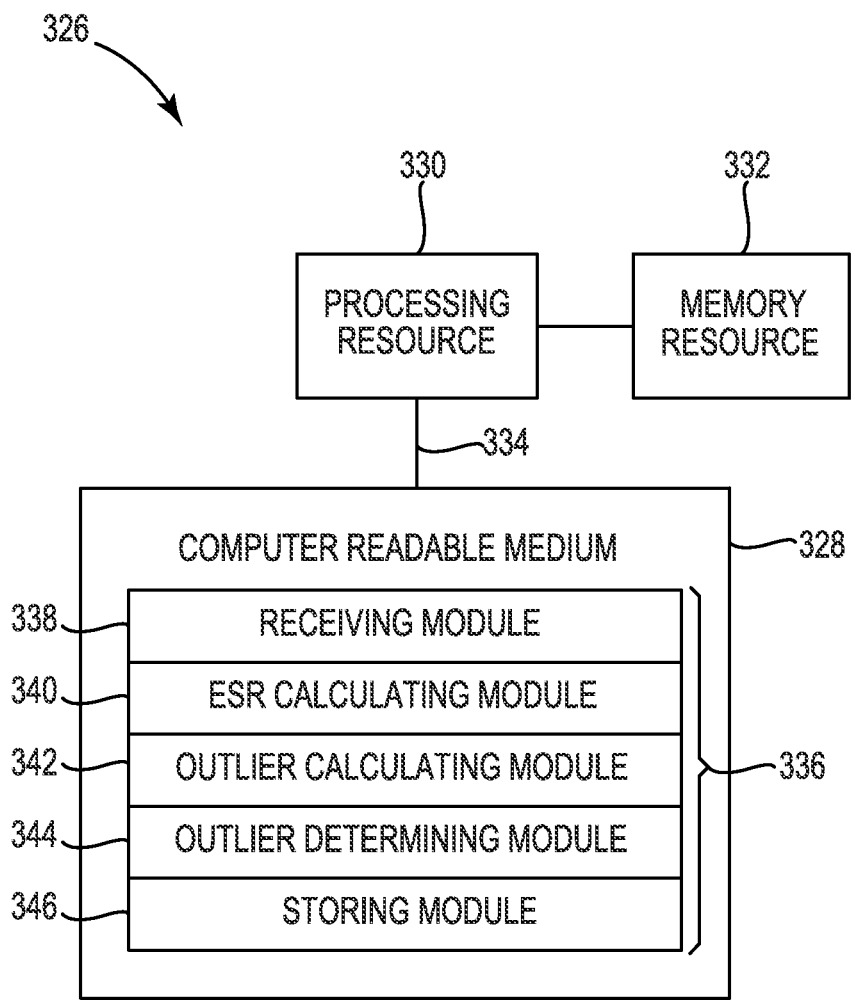
FIG. 3 illustrates a block diagram of an example of a computer-readable medium in communication with processing resources of a computing device according to the present disclosure.

FIG. 3 illustrates an example computing device 326 according to an example of the present disclosure. The computing device 326 can utilize software, hardware, firmware, and/or logic to perform a number of functions. The computing device 326 can include a number of remote computing devices.

The computing device 326 can be a combination of hardware and program instructions configured to perform a number of functions. The hardware, for example can include one or more processing resources 330, computer readable medium (CRM) 328, etc. The program instructions (e.g., computer-readable instructions (CRI) 336) can include instructions stored on the CRM 328 and executable by the processing resources 330 to implement a desired function (e.g., receive sample packets from a stream of packets over a time interval from a network element, etc.). The CRI 336 can also be stored in remote memory managed by a server and represent an installation package that can be downloaded, installed, and executed. The computing device 326 can include memory resources 332, and the processing resources 330 can be coupled to the memory resources 332.

Processing resources 330 can execute CRI 336 that can be stored on an internal or external non-transitory CRM 328. The processing resources 330 can execute CRI 336 to perform various functions, including the functions described with respect to FIG. 1 and FIG. 2.

A number of modules 338, 340, 342, 344, 346 can include CRI that when executed by the processing resources 330 can perform a number of functions. The number of modules 338, 340, 342, 344, 346 can be sub-modules of other modules. For example, the outlier calculating module 342 and the outlier determining module 344 can be sub-modules and/or contained within a single module. Furthermore, the number of modules 338, 340, 342, 344, 346 can comprise individual modules separate and distinct from one another.

A receiving module 338 can comprise CRI 336 and can be executed by the processing resources 330 to receive a first set of sample packets from a stream of packets over a time interval from a network element. In an example, the network element can collect sampling parameters associated with the first set of sample packets.

An ESR calculating module 340 can comprise CRI 336 and can be executed by the processing resources 330 to calculate an effective sampling ratio (ESR) by dividing a sample pool size of the stream of packets in the time interval by a total number of the first set of sample packets received from the stream of packets. As discussed herein, the ESR can express a ratio between the sampled set of packets and the stream of packets.

An outlier calculating module 342 can comprise CRI 336 and can be executed by the processing resources 330 to calculate an outlier value for the calculated ESR by dividing the difference between a mean of a previously calculated ESR and the calculated ESR by a standard deviation of the previously calculated ESR and the calculated ESR. In an example, a plurality of previously calculated ESRs can be used for calculation of the outlier value.

When initializing the computing device 326, unless the computing device 326 is preconfigured and/or the computing device 326 downloads a configuration file, the computing device may not have data regarding previously calculated ESR values for calculation of the outlier value. As such, for the first n time intervals, each of duration d, ESR values can be computed. For example, ESR values can be calculated for 100 sets of data. These ESR values can then be used as the plurality of previously calculated ESRs for calculation of the outlier value.

An outlier determining module 344 can comprise CRI 336 and can be executed by the processing resources 330 to determine whether the calculated ESR is an outlier by comparing the outlier value for the calculated ESR to a pre-defined outlier value. As discussed herein, the pre-defined outlier value can be calculated by calculating ESR values for a number of sets of sample packets.

A storing module 346 can comprise CRI 336 and can be executed by the processing resources 330 to determine whether to store the calculated ESR in an array of ESR values based on the comparison of the outlier value to the pre-defined outlier value. In an example, when the outlier value is within a pre-determined range of the pre-defined outlier value, the calculated ESR can be determined to not be an outlier versus the stored array of ESR values. As such, an instruction can be executed to store the ESR value in the array of ESR values. Alternatively, if the outlier value is not within a pre-determined range of the pre-defined outlier value, the calculated ESR can be determined to be an outlier versus the stored array of ESR values. As such, an instruction can be executed to not store the ESR value in the array of ESR values.

In an example of the present disclosure, instructions can be executed to calculate an ESR from a second set of sample packets from the stream of packets upon filling the array with ESR values and determine whether the ESR calculated from the second set of sample packets is an outlier versus the ESR values in the array. As discussed herein, the ESR values in the array can be determined to have not been corrupted and/or determined to have no transmission errors associated with them, and can thus be considered accurate ESR values. As such, an outlier value can be calculated for the ESR calculated from the second set of sample packets.

The outlier value for the ESR calculated from the second set of sample packets can be calculated by dividing the difference between a mean of ESR values in the ESR array and the ESR calculated from the second set of sample packets by a standard deviation of the ESR values in the ESR array and the ESR calculated from the second set of sample packets. In an example, a determination can then be made of whether the calculated ESR is an outlier by comparing the outlier value for the calculated ESR to the pre-defined outlier value.

In an example of the present disclosure, instructions can be executed to use the ESR calculated from the second set of sample packets to determine an extrapolated flow for a subclass of the second set of sample packets when the ESR calculated from the second set of sample packets is not an outlier versus the ESR values in the array. Alternatively, instructions can be executed to use a value for the ESR based on the ESR values in the array to determine the extrapolated flow for the subclass of the second set of sample packets when the ESR calculated from the second set of sample packets is an outlier versus the ESR values in the array. For example, a mean value of the ESR values in the array can be calculated and used for the ESR.

A non-transitory CRM 328, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM 328 can be integral, or communicatively coupled, to a computing device, in a wired and/or a wireless manner. For example, the non-transitory CRM 328 can be an internal memory, a portable memory, a portable disk, or a memory associated with another computing resource (e.g., enabling CRIs 336 to be transferred and/or executed across a network such as the Internet).

The CRM 328 can be in communication with the processing resources 330 via a communication path 334. The communication path 334 can be local or remote to a machine (e.g., a computer) associated with the processing resources 330. Examples of a local communication path 334 can include an electronic bus internal to a machine (e.g., a computer) where the CRM 328 is one of volatile, non-volatile, fixed, and/or removable storage medium in communication with the processing resources 330 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 334 can be such that the CRM 328 is remote from the processing resources e.g., processing resources 330, such as in a network connection between the CRM 328 and the processing resources (e.g., processing resources 330). That is, the communication path 334 can be a network connection. Examples of such a network connection can include a local area network (LAN), wide area network (WAN), personal area network (PAN), and the Internet, among others. In such examples, the CRM 328 can be associated with a first computing device and the processing resources 330 can be associated with a second computing device (e.g., a Java® server). For example, a processing resource 330 can be in communication with a CRM 328, wherein the CRM 328 includes a set of instructions and wherein the processing resource 330 is designed to carry out the set of instructions.

As used herein, "logic" is an alternative or additional processing resource to perform a particular action and/or function, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

The term "a number of" is meant to be understood as including at least one but not limited to one.

What is claimed:

1. A method for network flow analysis, comprising:
   receiving sample packets from a stream of packets over a time interval from a network element;
   aggregating the sample packets into a subclass of packets;
   determining a sample pool size of the stream of packets in the time interval, a number of sample packets received over the time interval, and a number of sample packets aggregated into the subclass of packets;
   calculating an effective sampling ratio (ESR) from the sample pool size of the stream of packets in the time interval and the number of sample packets received over the time interval;
   comparing the calculated ESR to a [historical ESR]numerical value to determine if the calculated ESR is within a predetermined range of the [historical ESR] numerical value; and
   calculating an extrapolated flow for the subclass of sample packets as a function of the calculated ESR and the number of sample packets aggregated into the subclass of packets when the calculated ESR is within the predetermined range of the [historical ESR]numerical value and calculating an extrapolated flow for the subclass of sample packets as a function of the [historical ESR] numerical value and the number of sample packets aggregated into the subclass of packets when the calculated ESR is outside the predetermined range of the [historical ESR]numerical value,
   wherein the numerical value is calculated as a function of a plurality of historical ESR values.

2. The method of claim 1, wherein the method includes determining whether the calculated ESR is an outlier versus a stored ESR.

3. The method of claim 2, wherein the method includes using the calculated ESR to determine the extrapolated flow for the subclass of sample packets when the calculated ESR is not an outlier versus the stored ESR.

4. The method of claim 1, wherein the method includes using a value for the calculated ESR based on a stored ESR to determine the extrapolated flow for the subclass of sample packets when the calculated ESR is an outlier versus the stored ESR.

5. The method of claim 4, wherein the value for the calculated ESR based on the stored ESR is determined by taking a mean value of a plurality of stored ESRs.

6. The method of claim 4, wherein the method includes:
   calculating a mean of the stored ESR and the calculated ESR; and
   determining whether the calculated ESR is an outlier versus the stored ESR as a function of a difference of the calculated mean and the calculated ESR divided by a standard deviation of the stored ESR.

7. The method of claim 1, wherein the method includes receiving sampling parameters associated with the sample packets that include at least one of a reporting interface associated with the sample packets, source and destination hosts, source and destination ports, protocols, type of service, and volume.

8. The method of claim 1, wherein calculating the ESR from the sample pool size of the stream of packets in the time interval and the number of sample packets received over the time interval includes dividing a difference between a sample pool number of a first packet and a sample pool number of a last packet in the stream of packets in the time interval by the number of sample packets received over the time interval.

9. A non-transitory computer-readable medium storing instructions for network flow analysis executable by a computer to cause the computer to:
   receive a first set of sample packets from a stream of packets over a time interval from a network element;
   calculate an effective sampling ratio (ESR) by dividing a sample pool size of the stream of packets in the time interval by a total number of the first set of sample packets received from the stream of packets;
   calculate an outlier value for the calculated ESR by dividing the difference between a mean of a previously calculated ESR and the calculated ESR by a standard deviation of the previously calculated ESR;
   determine whether the calculated ESR is an outlier by comparing the outlier value for the calculated ESR to a pre-defined outlier value;
   determine whether to store the calculated ESR or the previously calculated ESR in an array of ESR values based on the comparison of the outlier value to the pre-defined outlier value; and
   calculate an extrapolated flow for the first set of sample packets as a function of the stored ESR and the total number of the first set of sample packets.

10. The computer-readable medium of claim 9, wherein the instructions include instructions to:
- calculate an ESR from a second set of sample packets from the stream of packets upon filling the array with ESR values; and
- determine whether the ESR calculated from the second set of sample packets is an outlier versus the ESR values in the array.

11. The computer-readable medium of claim 10, wherein the instructions include instructions to:
- calculate an outlier value for the ESR calculated from the second set of sample packets by dividing the difference between a mean of ESR values in the ESR array and the ESR calculated from the second set of sample packets by a standard deviation of the ESR values in the ESR array and the ESR calculated from the second set of sample packets; and
- determine whether the calculated ESR from the second set of sample packets is an outlier by comparing the outlier value for the calculated ESR from the second set of sample packets to the pre-defined outlier value.

12. The computer-readable medium of claim 10, wherein the instructions include instructions to use the ESR calculated from the second set of sample packets to determine an extrapolated flow for a subclass of the second set of sample packets when the ESR calculated from the second set of sample packets is not an outlier versus the ESR values in the array.

13. The computer-readable medium of claim 10, wherein the instructions include instructions to use a value based on the ESR values in the array to determine an extrapolated flow for a subclass of the second set of sample packets when the ESR calculated from the second set of sample packets is an outlier versus the ESR values in the array.

14. A system for network flow analysis, the system comprising a processor in communication with a non-transitory computer-readable medium, wherein the computer-readable medium contains a set of instructions and wherein the processor is configured to carry out the set of instructions to:
- receive sample packets from a stream of packets over a time interval from a network element;
- aggregate the sample packets into a subclass of packets;
- calculate an effective sampling ratio (ESR) by dividing a sample pool size of the stream of packets in the time interval by a total number of sample packets received from the stream of packets;
- determine whether the calculated ESR is an outlier versus a stored array of ESR values by comparing the calculated ESR to at least one of the stored ESR values; and
- calculate an extrapolated flow for the subclass of packets by multiplying the calculated ESR by the number of sample packets aggregated into the subclass of packets when the calculated ESR is determined to not be an outlier versus the stored array of ESR values and calculate an extrapolated flow for the subclass of sample packets by multiplying the at least one of the stored ESR values and the number of sample packets aggregated into the subclass of packets when the calculated ESR is determined to be an outlier versus the stored array of ESR values.

15. The system of claim 14, wherein the stored array of ESR values is updated with the calculated ESR upon a determination that the calculated ESR is not an outlier versus the stored array of ESR values.

* * * * *